United States Patent
Sommer et al.

(10) Patent No.: US 11,984,578 B2
(45) Date of Patent: May 14, 2024

(54) PROCESS FOR MAKING AN AT LEAST PARTIALLY COATED ELECTRODE ACTIVE MATERIAL

(71) Applicant: BASF SE, Ludwigshafen am Rhein (DE)

(72) Inventors: Heino Sommer, Ludwigshafen (DE); Christoph Erk, Ludwigshafen (DE); Thomas Schaub, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 198 days.

(21) Appl. No.: 17/595,860

(22) PCT Filed: Jun. 17, 2020

(86) PCT No.: PCT/EP2020/066808
§ 371 (c)(1),
(2) Date: Nov. 29, 2021

(87) PCT Pub. No.: WO2021/001153
PCT Pub. Date: Jan. 7, 2021

(65) Prior Publication Data
US 2022/0246900 A1    Aug. 4, 2022

(30) Foreign Application Priority Data
Jul. 1, 2019 (EP) .................... 19183616

(51) Int. Cl.
*H01M 10/05* (2010.01)
*H01M 4/04* (2006.01)
*H01M 4/36* (2006.01)
*H01M 4/525* (2010.01)
*H01M 4/02* (2006.01)

(52) U.S. Cl.
CPC ......... *H01M 4/0421* (2013.01); *H01M 4/366* (2013.01); *H01M 4/525* (2013.01); *H01M 2004/028* (2013.01)

(58) Field of Classification Search
CPC ..................................................... H01M 4/525
See application file for complete search history.

(56) References Cited

U.S. PATENT DOCUMENTS

| 2016/0013475 A1 | 1/2016 | Ofer et al. |
| 2017/0069911 A1 | 3/2017 | Volkov et al. |

OTHER PUBLICATIONS

Miao-Miao Deng et al. Enhancing the electrochemical performances of LiNi0.5Mn1.5O4 by Co3O4 surface coating. May 22, 2018. Journal of Alloys and Compounds. Elsevier. 163-170 (Year: 2018).*
International Search Report dated Sep. 14, 2020, PCT/EP2020/066808.
Yan Xiaoxia et al, "The effect of Co3O4&LiCoO2cladding layer on the high rate and storage property . . . ," Electrochimica Acta, vol. 249, pp. 179-188, Jul. 5, 2017.
Tao Fen et al., Effects of PVP-assisted Co3O4coating on the electrochemical and storage properties of . . . , Electrochimica Acta, vol. 210, pp. 548-556, May 10, 2016.
Miao-Miao Dent, et al., "Enhancing the electrochemical performances of LiNi0.5Mn1.5O4 . . . ," Journal of Alloys and Compounds, vol. 762, pp. 163-170, Sep. 1, 2018.

* cited by examiner

*Primary Examiner* — Dah-Wei D. Yuan
*Assistant Examiner* — Kristen A Dagenais
(74) *Attorney, Agent, or Firm* — Armstrong Teasdale LLP

(57) ABSTRACT

Process for making an at least partially coated electrode active material wherein said process comprises the following steps: (a) Providing an electrode active material according to general formula $Li_{1+x}TM_{1-x}O_2$, wherein TM is a combination of Ni and Co or Ni and Al and, optionally, Mn, and, optionally, at least one metal selected from Ga, Nb, Ta, Mg, Mo, B, Sn, V, W, Ti and Zr, and x is in the range of from zero to 0.2, (b) treating said electrode active material with at least one carbonyl compound of Co, and (c) treating the material obtained in step (b) with an oxidant.

8 Claims, No Drawings

PROCESS FOR MAKING AN AT LEAST PARTIALLY COATED ELECTRODE ACTIVE MATERIAL

This application is a national stage filing under 35 U.S.C. § 371 of International Application No. PCT/EP2020/066808, filed on Jun. 17, 2020, which claims the benefit of priority to European Application No. 19183616.2, filed Jul. 1, 2019; the disclosure of each of these applications are each incorporated herein by reference in their entirety.

The present invention is directed towards a process for making an at least partially coated electrode active material wherein said process comprises the following steps:
(a) Providing an electrode active material according to general formula $Li_{1+x}TM_{1-x}O_2$, wherein TM is a combination of Ni and Co or Ni and Al, and, optionally, Mn, and, optionally, at least one metal selected from Ga, Mg, Nb, Ta, Mo, B, Sn, V, W, Ti and Zr, and x is in the range of from zero to 0.2,
(b) treating said electrode active material with at least one carbonyl compound of Co, and
(c) treating the material obtained in step (b) with an oxidant.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

In a further theory, the cobalt concentration on the grain boundaries is of importance, see, e.g., U.S. Pat. Nos. 9,209,455 and 9,391,317. The process, however, requires an additional calcination step that consumes a lot of energy.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process".

The inventive process comprises the following steps (a), (b) and (c), hereinafter also referred to as step (a), step (b) or step (c), respectively:
(a) Providing an electrode active material according to general formula $Li_{1+x}TM_{1-x}O_2$, wherein TM is r a combination of Ni and Co or Ni and Al, and, optionally, Mn, and, optionally, at least one metal selected from Ga, Nb, Ta, Mo, B, Sn, V, W, Mg, Ti and Zr, and x is in the range of from zero to 0.2,
(b) treating said electrode active material with at least one carbonyl compound of Co, and
(c) treating the material obtained in step (b) with an oxidant.

Step (a), step (b) and step (c) are described in more detail below. In the course of the present invention, step (a), step (b) and step (c) are performed subsequently.

The inventive process starts off from an electrode active material according to general formula $Li_{1+x}TM_{1-x}O2$, wherein TM comprises Ni and, optionally, at least one metal selected from Co and Al, and, optionally, Mn, and, optionally, at least one element selected from Al, Ba, B, and Mg and, wherein preferably at least 50 mole-% of TM is Ni, more preferably at least 75 mole-%, and x is in the range of from −0.05 to 0.2. Said material is hereinafter also referred to as starting material. In this context, combinations of Ni and Co or Ni and Al include combinations of Ni and Co and Al.

In one embodiment of the present invention the starting material has an average particle diameter (D50) in the range of from 3 to 20 µm, preferably from 5 to 16 µm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 1.2 m²/g. The BET surface may be determined by nitrogen adsorption after outgassing of the sample at 200° C. for 30 minutes or more and beyond this accordance with DIN ISO 9277:2010.

In one embodiment of the present invention, the starting material provided in step (a) has a moisture content in the range of from 20 to 2,000 ppm, determined by Karl-Fischer titration, preferred are 200 to 1,200 ppm.

In one embodiment of the present invention, the variable TM corresponds to formula (I)

$$(Ni_aCo_bMn_c)_{1-d}M_d \qquad (I)$$

with
a being in the range of from 0.7 to 0.99,
b being in the range of from 0.005 to 0.25,
c being in the range of from zero to 0.2, and
d being in the range of from zero to 0.1,
M is selected from Ga, Mg, Nb, W, Ti, Zr and Al, and a+b+c=1.

In one embodiment of the present invention, the variable TM corresponds to general formula (Ia)

$$(Ni_aCo_bMn_c)_{1-d}M^1_d \qquad (Ia)$$

with a+b+c=1 and
a being in the range of from 0.70 to 0.99, preferably from 0.75 to 0.95, more preferably from 0.83 to 0.95,
b being in the range of from 0.005 to 0.25, preferably from 0.025 to 0.2, more preferably from 0.025 to 0.1, c being in the range of from 0.005 to 0.25, preferably from 0.025 to 0.2, more preferably from 0.05 to 0.1, d being in the range of from zero to 0.1, preferably from zero to 0.04, $M^1$ is at least one of Al, Mg, W, Mo, Ti or Zr, preferably at least one of Al, Ti and W.

In one embodiment of the present invention, the variable c is zero, $M^1$ is Al or Mg and d is in the range of from 0.01 to 0.05. In another embodiment, $M^1$ is selected from Ti, Zr and W and d is in the range of from 0.001 to 0.1.

In another embodiment of the present invention, the variable TM corresponds to general formula (Ib)

$$(Ni_{a*}Co_{b*}Al_{e*})_{1-d*}M^2_{d*} \qquad (Ib)$$

with $a*+b*+e*=1$ and a* being in the range of from 0.70 to 0.99, preferably from 0.75 to 0.95, more preferably from 0.88 to 0.95, b* being in the range of from 0.005 to 0.25, preferably from 0.025 to 0.2, more preferably from 0.025 to 0.1, e* being in the range of from 0.005 to 0.2, preferably from 0.01 to 0.2, more preferably from 0.015 to 0.04, d* being in the range of from zero to 0.1, preferably from zero to 0.02, $M^2$ is at least one of W, Mo, Ti or Zr.

The variable x is in the range of from −0.05 to 0.2.

In one embodiment of the present invention, the variable TM corresponds to general formula (Ic)

$$Ni_{1-d}M^3_d \qquad (Ic)$$

with d being in the range of from zero to 0.1, preferably from zero to 0.04, $M^3$ is at least one of Co, Mg, Mn, Al, W, Mo, Ti or Zr, preferably Al.

In one embodiment of the present invention TM corresponds to general formula (Ia) and x is in the range from zero to 0.2, preferably from zero to 0.1 and even more preferably 0.01 to 0.05.

In one embodiment of the present invention TM corresponds to general formula (Ib) and x is in the range of from −0.05 to zero.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention. Traces in this context will mean amounts of 0.05 mol-% or less, referring to the total metal content of the starting material.

In step (b), said electrode active material provided in step (a) is treated with at least one carbonyl compound of Co. Carbonyl compounds of Co refer to compounds wherein Co is a complex with at least one CO ligand per Co atom.

Preferably, said carbonyl compound of Co is selected from $Co_2(CO)_8$ and $Co(CO)_3NO$. In one embodiment of the present invention, $Co_4(CO)_{12}$ is formed in situ and deposited on said electrode active material provided in step (a), alone or in combination with $Co_2(CO)_8$.

In one embodiment of the present invention, carbonyl compound provided in step (b) is used in relation to the electrode active material in a ratio of 0.001 to 30% by weight, preferably in a ratio of 0.1 to 10%.

In one embodiment of the present invention, step (b) is carried out at a temperature of 100 to 500° C., preferably at temperature of 150 to 300° C.

In one embodiment of the present invention, step (b) is carried out at a pressure of 0.001 bar to 20 bar, preferably at a pressure of 0.01 to 2 bar.

In one embodiment of the present invention, step (b) is performed in bulk.

In one embodiment of the present invention, step (b) is performed in the gas phase. In the context of step (b) of the present invention, "in the gas phase" means that the carbonyl compound is in the gas phase but the electrode active material provided in step (a) is solid.

In one embodiment of the present invention, step (b) is performed in a fluidized bed or a moving bed.

In one embodiment of the present invention, the duration of step (b) is in the range of from 10 minutes to 2 hours.

In step (c), the material obtained in step (b) is treated with an oxidant. Said oxidant may be in solution, in bulk or in the gas phase. It is preferred that step (c) is performed in the gas phase. In the context of step (c) of the present invention, "in the gas phase" means that the oxidant is in the gas phase but the material obtained in step (b) is solid.

In one embodiment of the present invention, both steps (b) and (c) are performed in the gas phase.

In one embodiment of the present invention, the oxidant in step (c) is selected from oxygen and ozone. Oxygen may be provided in the form of air, oxygen-enriched air, for example a mixture of air and oxygen of 2:3 by volume or 1:2 by volume or 2:1 by volume, or as pure oxygen. Mixtures of oxygen and "synthetic air" are feasible as well, for example 4:1 or 5:1 by volume of oxygen and nitrogen. Ozone is preferably provided as mixture of ozone and oxygen, for example 5 to 10% by volume of ozone in oxygen.

In another embodiment of the present invention, the oxidant in step (c) is selected from inorganic peroxides, for example $Li_2O_2$. Upon reaction of adsorbed carbonyl compound of cobalt with inorganic peroxides, for example $Li_2O_2$, metallic cobalt and carbon dioxide are formed, followed by the formation of $LiCoO_2$.

In one embodiment of the present invention, step (c) is performed at a temperature in the range of from zero to 700° C., preferably 100 to 700° C., even more preferably 500 to 700° C.

In one embodiment of the present invention, the duration of step (c) is in the range of from 10 minutes to 3 hours. The duration is calculated as the time of exposure of material from step (b) to said oxidant.

In step (c), unreacted carbonyl compound of Co is removed and/or destroyed.

In one embodiment of the present invention, step (c) is performed in a fluidized bed or a moving bed, fluidized beds being preferred. In another embodiment, step (c) is performed in a pusher kiln.

In one embodiment of the present invention, steps (b) and (c) are performed in the same type of reactor, for example steps (b) and (c) are performed in a rotary kiln, in a free fall mixer, in a continuous vibrating bed or in a fluidized bed. In an even more preferred embodiment, both step (b) and (c) are performed in the same reactor, for example in a rotary kiln, in a free fall mixer, in a continuous vibrating bed or in a fluidized bed.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

By the inventive process, partially coated electrode active materials may be obtained. They exhibit excellent stability against undesired oxidation at 4.3V vs. Li/Li$^+$. LiCoO$_2$ and other Co-oxide species are located in island-like structure on the surface of electrode active material.

The inventive process may comprise one or more optional steps. For example, between step (b) and (c) a flushing step may be performed. Said flushing may be performed, e.g., with nitrogen or with a rare gas such as Ar.

Preferably, said flushing step is performed with a gas with low CO$_2$ content, e.g., a carbon dioxide content in the range of from 0.01 to 500 ppm by weight, preferred are 0.1 to 50 ppm by weight. The CO$_2$ content may be determined by, e.g., optical methods using infrared light. It is even more preferred to perform said flushing step with a gas with a carbon dioxide content below detection limit for example with infrared-light based optical methods.

Said flushing step may have a duration in the range of from 5 to 30 minutes. A preferred temperature range of the flushing step is 25 to 120° C.

In one embodiment of the present invention, the inventive process comprises an additional thermal treatment after-treatment step (d).

Step (d) may be carried out in any type of oven, for example a roller hearth kiln, a pusher kiln, a rotary kiln, a pendulum kiln, or—for lab scale trials—in a muffle oven. In other embodiments, especially in those where step (c) is carried out in a fluidized bed, step (d) is carried out in a fluidized bed as well.

The temperature of the thermal treatment according to step (d) may be in the range of from 150 to 900° C., preferably 200 to 700° C. and even more preferably from 200 to 450° C.

The temperature of 350 to 700° C. corresponds to the maximum temperature of step (d).

It is possible to subject the material obtained from step (c) directly to step (d). However, it is preferred to increase the temperature stepwise, or to ramp up the temperature, or to dry the material obtained after step (c) at first at a temperature in the range of from 40 to 80° C. before subjecting it to step (d). Said step-wise increase or ramping up may be performed under normal pressure or reduced pressure, for example 1 to 500 mbar.

Step (d)—at its maximum temperature—may be performed at 600 mbar to 2 bar, preferably under normal pressure.

In one embodiment of the present invention, step (d) is carried out under an oxygen-containing atmosphere, for example air, oxygen-enriched air or pure oxygen.

In one embodiment of the present invention, step (d) is carried out under an atmosphere with reduced CO$_2$ content, e.g., a carbon dioxide content in the range of from 0.01 to 500 ppm by weight, preferred are 0.1 to 50 ppm by weight. The CO$_2$ content may be determined by, e.g., optical methods using infrared light. It is even more preferred to perform step (d) under an atmosphere with a carbon dioxide content below detection limit for example with infrared-light based optical methods.

In one embodiment of the present invention step (d) has a duration in the range of from 1 to 10 hours, preferably 90 minutes to 6 hours.

A further aspect of the present invention relates to an electrode active material, hereinafter also referred to as inventive electrode active material. Inventive electrode active materials are in particulate form and have the general formula Li$_{1+x1}$TM$_{1-x1}$O$_2$, wherein TM comprises a combination of Ni and Co or Ni and Al and, optionally, at least one metal selected from Al and Mn, and, optionally, at least one element selected from Al, Mg, Ba and B, and from transition metals other than Ni, Co, and Mn, and x1 is in the range of from −0.05 to 0.2, wherein at least 50 mole-% of the transition metal of TM is Ni, wherein the outer surface of said particles is non-homogeneously coated with Co$_3$O$_4$ and LiCoO$_2$.

In a preferred embodiment of the present invention, the coating is non-homogeneous, for example in an island structure. This means that there are non-coated parts of electrode active material that do not display any LiCoO$_2$, and there are "islands" that exhibit such coating, detectable, e.g., by TEM ("Transmission Electron Microscopy") including EDS mapping and electron diffraction.

In one embodiment of the present invention inventive electrode active materials have an average particle diameter (D50) in the range of from 3 to 20 μm, preferably from 5 to 16 μm. The average particle diameter may be determined, e.g., by light scattering or LASER diffraction or electroacoustic spectroscopy. The particles are usually composed of agglomerates from primary particles, and the above particle diameter refers to the secondary particle diameter.

In one embodiment of the present invention, inventive electrode active materials have a surface (BET) in the range of from 0.1 to 0.8 m$^2$/g, determined according to DIN-ISO 9277:2003-05.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopoly-ethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co) polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Nonaqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

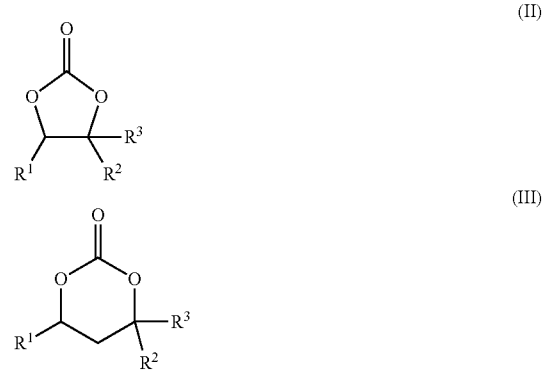

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

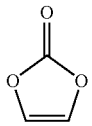

(IV)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General Remarks:

The carbonyl compounds of Co [$Co(CO)_3NO$] and [$Co_2(CO)_8$] were commercial available and used as is. Due to the air- and moisture sensitivity of [$Co(CO)_3NO$] and [$Co_2(CO)_8$], all manipulations on the treating of the electrode active material with carbonyl of Co where carried out under argon by using an argon-filled glovebox or Schlenk techniques.

Generally, all steps following calcination were performed under an atmosphere with moisture content below 500 ppm.

Precipitation of TM-OH.1 (Precursor):

The aqueous solution of $(NH_4)_2SO_4$ used in the precursor manufacture examples contained 26.5 g $(NH_4)_2SO_4$ per kg solution Precipitation of nickel hydroxide was performed at 55° C. under a nitrogen atmosphere using a continuous stirred tank reactor with a volume of 2.3 l. The continuous stirred tank reactor was charged with 1.5 l of the above aqueous solution of $(NH_4)_2SO_4$. Then, the pH value of the solution was adjusted to 11.5 using an 25% by weight aqueous solution of sodium hydroxide. An aqueous metal solution containing $NiSO_4$, $CoSO_4$ and $MnSO_4$ (molar ratio 83:12:5, total metal concentration: 1.65 mol/kg), aqueous sodium hydroxide (25 wt % NaOH) and aqueous ammonia solution (25 wt % ammonia) were simultaneously introduced into the vessel. The molar ratio between ammonia and metal was adjusted to 0.265. The sum of volume flows was set to adjust the mean residence time to 5 hours. The flow rate of the NaOH was adjusted by a pH regulation circuit to keep the pH value in the vessel at a constant value of 11.58. The apparatus was operated continuously keeping the liquid level in the vessel constant. A mixed hydroxide of Ni, Co and Mn was collected via free overflow from the vessel. The resulting product slurry contained about 120 g/l mixed hydroxide of Ni, Co and Mn with an average particle size (D50) of 10.5 μm, TM-OH.1.

Calcination of TM-OH.1:

Subsequently, TM-OH.1 was mixed with $LiOH \cdot H_2O$ at a molar ratio of Li:Ni of 1.05:1 and 0.17 mol % $ZrO_2$ and 0.17 mol-% $TiO_2$, percentages referring to TM, and calcined at 780° C. with a dwell time of 10 hours in a flow of pure oxygen. The heating rate was 3° C./min. Particulate lithium nickel oxide was obtained and sieved using a mash size of 32 μm.

Step (b), General Protocol:

The cobalt content deposited on the electrode active material was determined by ICP-OES 100 g of B-CAM.1 were mixed with $Co_2(CO)_8$ (stabilized with 5 wt % n-hexane) and transferred into a 300 mL autoclave under an atmosphere of $N_2$. The amount of $Co_2(CO)_8$ was selected to correspond to 2 or 5 mol % with respect to TM in B-CAM.1.

Under magnetic stirring, 10 bar of $N_2$ gas was applied to the autoclave and slowly relaxed for 3 times. The autoclave was then heated to 200° C. for 5 h while stirring the mixture of B-CAM.1 and $Co_2(CO)_8$ at 100 rpm. Then, the resultant powder was cooled to ambient temperature. Non-oxidized materials were obtained, no-CAM.1 with 2% by weight of deposited Co and no-CAM.2 with 5% by weight of deposited Co.

Step (c), Exemplified Protocol:

A sample of no-CAM.1 was heated in box-type furnace under a flow of oxygen (10 volume exchanges per hour) to the temperature indicated in Table 2 below. The heating rate was 3° C./min. Then, the materials so obtained were cooled to ambient temperature, followed by cooling to a dew point of −40° C. in a dry-room. After deagglomeration and sieving over a sieving tower with stainless steel meshes (32 μm mesh size), inventive cathode active materials were obtained.

TABLE 1 experimental set-up step (b)

| | CAM [mg] | Co carbonyl | amount of Co carbonyl | Step (b): T [° C.] | t/h |
|---|---|---|---|---|---|
| no-CAM.1 | 500 | $Co_2(CO)_8$ | 100 mg | 200 | 5 |
| no-CAM.2 | 500 | $Co_2(CO)_8$ | 250 mg | 200 | 5 |

TABLE 2

Experimental set-up step (c)

| starting | Step (c): T [° C.] | t/h | result |
|---|---|---|---|
| no-CAM.1 | 500 | 5 | CAM.1.1 |
| no-CAM.1 | 700 | 5 | CAM.1.2 |
| no-CAM.1 | 800 | 5 | CAM.1.3 |
| no-CAM.2 | 500 | 5 | CAM.2.1 |
| no-CAM.2 | 700 | 5 | CAM.2.2 |
| no-CAM.2 | 800 | 5 | CAM.2.3 |

Manufacture of Cells:

The positive electrodes for the electrochemical cycling experiments in coin cells were manufactured by coating on aluminum foil (thickness=20 μm) using a continuous doctor knife coating system with subsequent drying (Mathis, KTF-S) a slurry containing 94 wt. % cathode active material (94 wt. %), 1 wt. % active carbon (Super C65 L purchased form Imerys), 2 wt. % graphite (SFG6L from Imerys) and 3 wt. % polyvinylidene fluoride (PVdF) binders suspended in N-methyl-2-pyrrolidinone (NMP). Typically, all the slurries were prepared based on at least 30 g of cathode active material and the amount of NMP employed was such that the total solid content (CAM+SuperC65 L+SFG6L+PVdF) was ca. 65%. Before the cell assembly, the electrode tapes were dried in a hot-air chamber at 120° C. over a period of 16 hours and finally pressed using a roll calendar.

Electrochemical testings of the above cathode active materials were carried out in coin half cells (vs. Li metal as anode material, 1M $LiPF_6$ in EC:EMC wt % as electrolyte (EC=ethylene carbonate, EMC=ethyl methyl carbonate), GF/D glass fiber separator (Whatman), and CR2032 from Hohsen Corp.) to obtain a 1$^{st}$ cycle discharge capacity.

| | B-CAM.1 | no-CAM.1 | CAM.1.1 | CAM.1.2 | CAM.1.3 |
|---|---|---|---|---|---|
| Discharge capacity [mA · h/g] | 196.6 | 184.0 | 199.8 | 197.5 | n.d. |
| Coulombic efficiency [%] | 85.8 | 77.3 | 87.9 | 86.2 | n.d. |
| C/10 discharge capacity [mA · h/g] after 120 cycles | 185.5 | 181.7 | 188.0 | 189.7 | 187.0 |
| 1 C. discharge capacity [mA · h/g] after 37 cycles | 183.9 | 175.8 | n.d. | 184.2 | n.d. |
| after 57 cycles | 180.4 | 171.9 | n.d. | 180.9 | n.d. |
| after 77 cycles | 176.1 | 167.6 | n.d. | 177.3 | n.d. |
| after 97 cycles | 171.3 | 163.4 | n.d. | 173.8 | n.d. |
| after 117 cycles | 165.1 | 158.6 | 165.9 | 170.0 | 165.8 |

The invention claimed is:

1. A process for making an at least partially coated electrode active material wherein the process comprises the following steps:
    (a) providing an electrode active material according to general formula $Li_{1+x}TM_{1-x}O_2$, wherein TM is a combination of Ni and Co or Ni and Al, and, optionally, Mn, and, optionally,
    at least one metal chosen from Ga, Nb, Ta, Mo, B, Sn, V, W, Mg, Ti, and Zr, and x ranges from zero to 0.2,
    (b) treating the electrode active material with at least one compound of Co, wherein Co is a complex with at least one CO ligand per Co atom, and
    (c) treating the material obtained in step (b) with an oxidant chosen from inorganic peroxides and oxygen, and a mixture of ozone and oxygen.

2. The process according to claim 1, wherein steps (b) and (c) are performed in a gas phase.

3. The process according to claim 1, wherein step (b) is performed in bulk.

4. The process according to claim 1, wherein the carbonyl compound of Co is chosen from $Co_2(CO)_8$ and $Co(CO)_3NO$.

5. The process according to claim 1, further comprising thermally treating after-treatment step (d).

6. The process according to claim 1, wherein steps (b) and (c) are performed in a rotary kiln, in a free fall mixer, in a continuous vibrating bed, or in a fluidized bed.

7. The process according to claim 1, further comprising flushing between step (b) and (c).

8. The process according to claim 1, wherein TM is a combination of transition metals according to general formula (I)

$$(Ni_aCo_bMn_c)_{1-d}M_d \quad (I)$$

with
a ranging from 0.7 to 0.99,
b ranging from 0.005 to 0.25,
c ranging from zero to 0.2, and
d ranging from zero to 0.1,
M is chosen from Ga, Mg, Nb, W, Ti, Zr, and Al, and a+b+c=1.

* * * * *